(12) United States Patent
Ooishi

(10) Patent No.: US 8,279,291 B2
(45) Date of Patent: Oct. 2, 2012

(54) IMAGE TRANSFORMING APPARATUS USING PLURAL FEATURE POINTS AND METHOD OF CONTROLLING OPERATION OF SAME

(75) Inventor: Makoto Ooishi, Kurokawa-gun (JP)

(73) Assignee: FUJIFILM Corporation, Tokyo (JP)

(*) Notice: Subject to any disclaimer, the term of this patent is extended or adjusted under 35 U.S.C. 154(b) by 241 days.

(21) Appl. No.: 12/768,449

(22) Filed: Apr. 27, 2010

(65) Prior Publication Data

US 2010/0271501 A1 Oct. 28, 2010

(30) Foreign Application Priority Data

Apr. 28, 2009 (JP) ................................. 2009-108833

(51) Int. Cl.
*H04N 5/225* (2006.01)
*H04N 5/228* (2006.01)
*G06K 9/32* (2006.01)
(52) U.S. Cl. ....................... 348/208.6; 348/170; 382/294
(58) Field of Classification Search .................. 348/170, 348/171, 172, 208.1, 208.6, 208.14, 218.1; 382/294, 284
See application file for complete search history.

(56) References Cited

U.S. PATENT DOCUMENTS

| 5,062,056 | A  | * | 10/1991 | Lo et al. ......................... 235/411 |
| 5,473,369 | A  | * | 12/1995 | Abe ............................... 348/169 |
| 6,473,536 | B1 | * | 10/2002 | Chiba et al. ..................... 382/284 |
| 7,468,743 | B2 | * | 12/2008 | Washisu ....................... 348/208.1 |
| 7,557,832 | B2 | * | 7/2009  | Lindenstruth et al. ... 348/208.99 |
| 7,729,543 | B2 | * | 6/2010  | Murashita et al. ............. 382/190 |
| 7,742,690 | B2 | * | 6/2010  | Tabuchi et al. .................. 396/52 |
| 7,925,053 | B2 | * | 4/2011  | Altherr .......................... 382/107 |
| 7,986,853 | B2 | * | 7/2011  | Washisu ......................... 382/274 |
| 2004/0238718 | A1 | * | 12/2004 | Washisu ....................... 250/201.2 |
| 2006/0078162 | A1 | * | 4/2006 | Wonneberger ................. 382/103 |
| 2007/0058046 | A1 | * | 3/2007 | Kagei ........................ 348/208.14 |
| 2008/0232715 | A1 | * | 9/2008 | Miyakawa et al. ........... 382/284 |
| 2008/0259172 | A1 | * | 10/2008 | Tamaru ....................... 348/218.1 |
| 2009/0091633 | A1 | * | 4/2009 | Tamaru ..................... 348/208.14 |
| 2009/0115856 | A1 | * | 5/2009 | Washisu ...................... 348/208.1 |
| 2009/0128641 | A1 | * | 5/2009 | Ozluturk ..................... 348/208.6 |
| 2010/0104217 | A1 | * | 4/2010 | Tsurumi ...................... 382/284 |
| 2010/0166319 | A1 | * | 7/2010 | Zhang ............................ 382/201 |
| 2010/0245604 | A1 | * | 9/2010 | Ohmiya et al. ........... 348/208.99 |
| 2010/0278433 | A1 | * | 11/2010 | Ooishi ........................... 382/195 |
| 2012/0069203 | A1 | * | 3/2012 | Voss et al. ................... 348/208.1 |

FOREIGN PATENT DOCUMENTS

| JP | 2000155831 A | 6/2000 |
| JP | 2004357202 A | 12/2004 |

* cited by examiner

*Primary Examiner* — John Villecco
(74) *Attorney, Agent, or Firm* — Sughrue Mion, PLLC

(57) ABSTRACT

First and second images are obtained by continuous shooting. Overall-image shake between the first and second images is detected and shake is corrected. If the image of an automobile, for example, contained in the first and second images is moving from capture of the first image to capture of the second image, the image of the automobile is moved in the second image so as to coincide with the image of the automobile in the first image. The image of the automobile in the first image and the image obtained by moving the image of the automobile are superimposed. Two image frames can be superimposed in accordance with portions in which there is movement of a subject and portions in which there is no movement of the subject but in which blur has occurred owing to camera shake.

7 Claims, 15 Drawing Sheets

REFERENCE IMAGE

CORRESPONDING IMAGE

REFERENCE IMAGE

CORRESPONDING IMAGE

REFERENCE IMAGE

CORRESPONDING IMAGE

REFERENCE IMAGE

CORRESPONDING IMAGE

IMAGE TRANSFORMING APPARATUS USING PLURAL FEATURE POINTS AND METHOD OF CONTROLLING OPERATION OF SAME

BACKGROUND OF THE INVENTION

1. Field of the Invention

This invention relates to an apparatus for transforming an image and to a method of controlling the operation of this apparatus.

2. Description of the Related Art

When the image of a subject is captured, a short exposure time is preferred in terms of diminished camera shake. On the other hand, a short exposure time results in a darker image. In order to deal with this, there is a technique whereby the image of the same subject is captured twice at short exposure times to thereby reduce the effects of camera shake, and the two image frames thus obtained are superimposed in order to brighten the resultant image (see the specifications of Japanese Patent Application Laid-Open Nos. 2004-357202 and 2000-155831). However, in a case where a moving object such as an automobile is present among the subjects, there are instances where superimposing two image frames results in blurring of the subject image of the moving object in the image obtained by such superimposition (referred to as the "superimposed image" below).

SUMMARY OF THE INVENTION

Accordingly, an object of the present invention is to generate an image in which not only camera shake but also the blurring of the subject image of a moving object can be prevented.

According to the present invention, the foregoing object is attained by providing an image transforming apparatus comprising: a first feature point deciding device for deciding a plurality of feature points, which indicate the shape features of a subject image, from within a first image, wherein the first image and a second image have been obtained by continuous shooting; a first corresponding point deciding device for deciding corresponding points, which correspond to the feature points decided by the first feature point deciding device, from within the second image; a moving subject image detecting device for detecting moving subject images in respective ones of the first and second images, the moving subject images being subject images contained in the first and second images and representing an object moving from capture of the first image to capture of the second image; a transformation target area setting device for setting transformation target areas in respective ones of the first and second images, the transformation target areas enclosing both the positions of feature points, which are present in the moving subject image detected by the moving subject image detecting device, from among the feature points decided by the first feature point deciding device, and the positions of corresponding points, which are present in the moving subject image detected by the moving subject image detecting device, from among the corresponding points decided by the first corresponding point deciding device; a second feature point deciding device for deciding a plurality of feature points of an image within the transformation target area of the first image set by the transformation target area setting device; a second corresponding point deciding device for deciding corresponding points, which correspond to the feature points decided by the second feature point deciding device, in an image within the transformation target area of the second image set by the transformation target area setting device; and a first image transforming device for transforming the image within the transformation target area of the second image in such a manner that the feature points decided by the second feature point deciding device and the corresponding points decided by the second corresponding point deciding device will coincide.

The present invention also provides an operation control method suited to the image transforming apparatus described above. Specifically, a method of controlling an image transforming apparatus comprises the steps of: deciding a plurality of first feature points, which indicate the shape features of a subject image, from within a first image, wherein the first image and a second image have been obtained by continuous shooting; deciding first corresponding points, which correspond to the first feature points that have been decided, from within the second image; detecting moving subject images in respective ones of the first and second images, the moving subject images being subject images contained in the first and second images and representing an object moving from capture of the first image to capture of the second image; setting transformation target areas in respective ones of the first and second images, the transformation target areas enclosing both the positions of first feature points, which are present in the moving subject image that has been detected, from among the first feature points that have been decided, and the positions of first corresponding points, which are present in the moving subject image that has been detected, from among the first corresponding points that have been decided; deciding a plurality of second feature points of an image within the set transformation target area of the first image; deciding second corresponding points, which correspond to the second feature points that have been decided, in an image within the set transformation target area of the second image; and transforming the image within the transformation target area of the second image in such a manner that the second feature points that have been decided and the second corresponding points that have been decided will coincide.

The present invention also provides a computer-readable program for implementing the above-described method of controlling the operation of an image transforming apparatus. The invention may also be adapted so as to provide a recording medium on which this program has been stored and which can be removably inserted into a computer.

In accordance with the present invention, first and second images are obtained by continuous shooting. A plurality of feature points indicating the shape features of a subject image are decided from within the first image. The feature points are points on the contours of a plurality of subject images contained in an image, points at which the shape of a subject image changes, etc. Corresponding points that correspond to the decided feature points are decided from within the second image.

Moving subject images, which are subject images contained in the first and second images and represent an object moving from capture of the first image to capture of the second image, are detected in respective ones of the first and second images. A transformation target area that encloses the positions of feature points present in the detected moving subject image and the positions of corresponding points present in the detected moving subject image is decided in each of the first and second images.

Feature points of the image within the transformation target area in the first image are decided. The corresponding points that correspond to the features points of the image within the transformation target area of the first image are decided with regard to the image within the transformation target area in the second image. The image within the transformation target area of the second image is transformed in such a manner that the feature points of the image within the transformation target area of the first image and the corresponding points of the image within the transformation target area of the second image will coincide.

In accordance with the present invention, a moving subject image, which represents an object moving from capture of the first image to capture of the second image, is detected and an image transformation area is set so as to enclose the positions of the moving subject image before and after the movement thereof. The position of the subject image contained in the image transformation area of the first image and the position of the subject image contained in the image transformation area of the second image will be displaced from each other because the subject image is moving between capture of the first image and capture of the second image. For this reason, the image within the transformation target area of the second image is transformed in such a manner that the feature points of the image within the transformation target area of the first image and the corresponding points of the image within the transformation target area of the second image will coincide.

Preferably, the apparatus further comprises a second image transforming device for transforming an image external to the transformation target area in the second image in such a manner that the corresponding points decided by the first corresponding point deciding device will coincide with the feature points decided by the first feature point deciding device. The portion external to the set transformation target area is considered to be prone to camera shake at the time of image capture if there is a shift between the first and second images. In order to correct for this camera shake, therefore, the second image is transformed in such a manner that the feature points decided by the first feature point deciding device and the corresponding points decided by the first corresponding point deciding device will coincide. As a result, the second image obtained is one that has been corrected for camera shake.

Preferably, the apparatus further comprises a superimposing device for superimposing (inclusive of combining, adding or averaging) the image that has been transformed by the first image transforming device on the first image with regard to the image within the transformation target area, and, with regard to the image external to the transformation target area, superimposing the second image on the first image in such a manner that the corresponding points decided by the first corresponding point deciding device will coincide with the feature points decided by the first feature point deciding device.

Preferably, the apparatus further comprises an image capture device for obtaining the first and second images by performing continuous shooting at the same amounts of exposure or at different amounts of exposure.

Preferably, the apparatus further comprises an electronic-flash control device for controlling an electronic-flash light emission, and an image capture control device for controlling the image capture device so as to shoot under the electronic-flash light emission and shoot under the absence of the electronic-flash light emission controlled by the electronic-flash control device, and obtaining the first and second images.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1A:
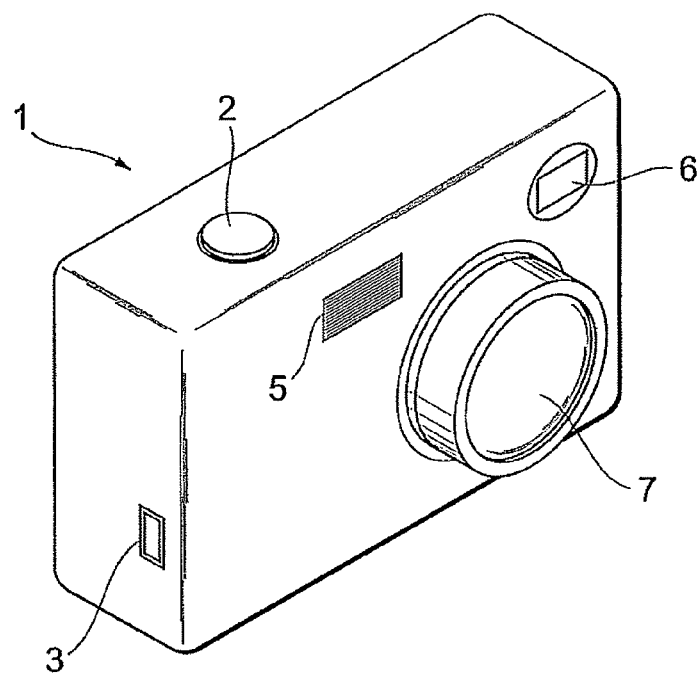
FIG. 1A is a perspective view of a digital still camera as seen from the front.

FIG. 1A, which illustrates a preferred embodiment of the present invention, is a perspective view of a digital still camera 1 as seen from the front.

The top of the digital still camera 1 is formed to have a shutter-release button 2. The right side face of the digital still camera 1 is formed to have a terminal 3 for connecting a USB (Universal Serial Bus) cable.

The front side of the digital still camera 1 is formed to have a zoom lens 7, an electronic flash 5 is formed at the upper left of the zoom lens 7, and an optical viewfinder 6 is formed at the upper right of the zoom lens 7.

Figure 1B:
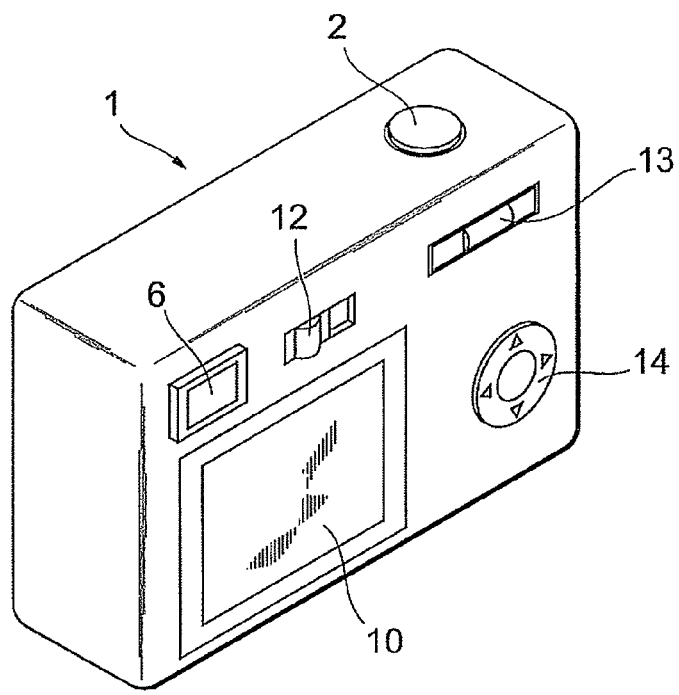
FIG. 1B is a perspective view of the digital still camera as seen from the back.

FIG. 1B is a perspective view of the digital still camera 1 as seen from the back.

A liquid crystal display screen 10 is formed on the back side of the digital still camera 1 at the lower left thereof. The optical viewfinder 6 is formed at the upper left of the liquid crystal display screen 10. A power switch 12 is formed at the right of the optical viewfinder 6. A mode switch 13 is formed at the right of the power switch 12. A shooting mode and a playback mode are set by the mode switch 13. Provided below of the mode switch 13 is a round button 14 with which the arrows toward upper, lower, right and left directions. A continuous shooting mode etc. can be set with this button 14.

Figure 2:
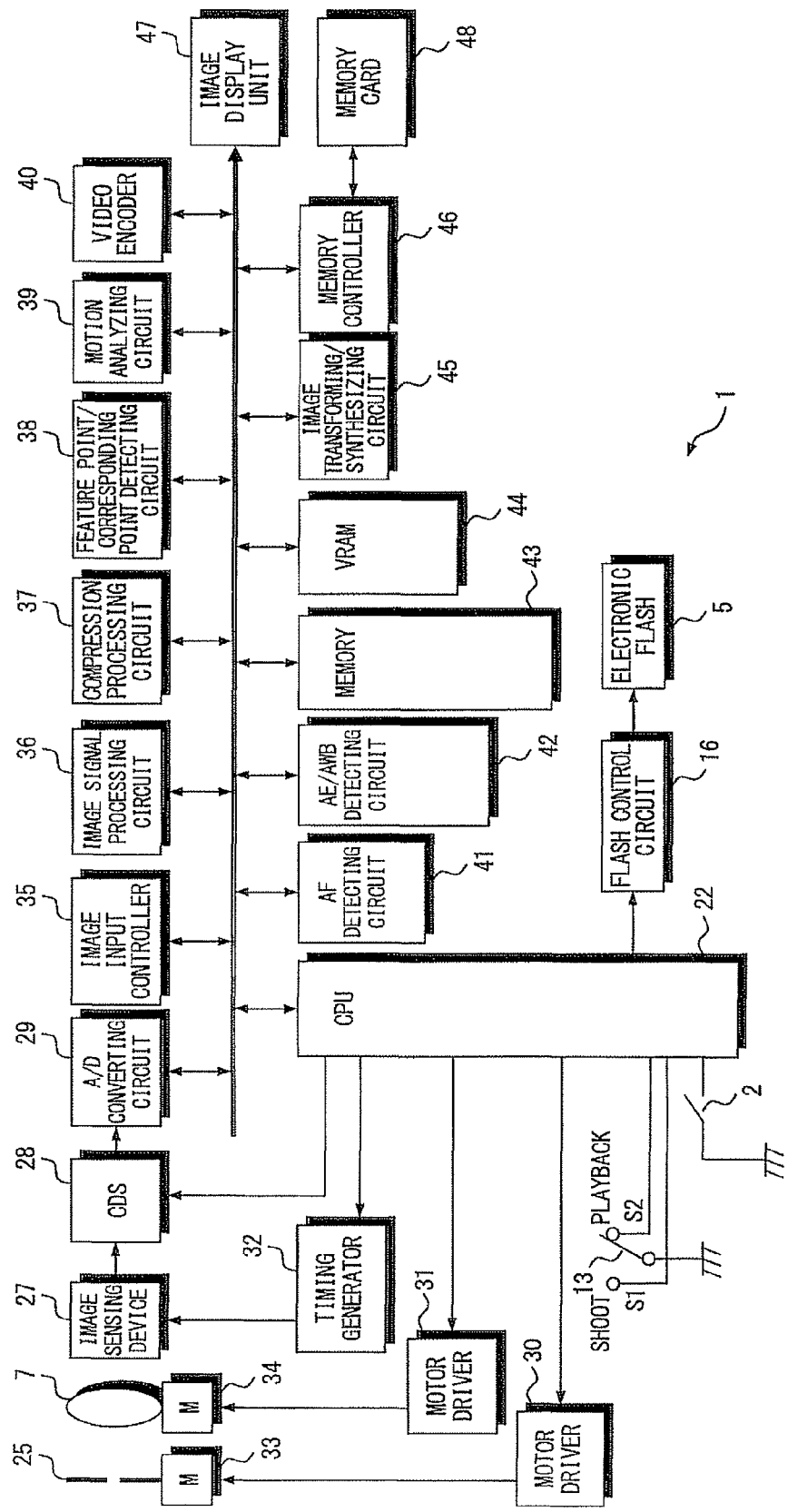
FIG. 2 is a block diagram illustrating the electrical configuration of the digital still camera.

FIG. 2 is a block diagram illustrating the electrical configuration of the digital still camera 1.

The overall operation of the digital still camera 1 is controlled by a CPU 22.

The digital still camera 1 includes a memory 43 in which an operation program and other data, described later, have been stored. The operation program may be written to a memory card 48 or the like, read out of the memory card 48 and installed in the digital still camera 1, or the operation program may be pre-installed in the camera.

The digital still camera 1 includes a shutter-release button 2 and a mode switch 13, as described above. A signal indicating pressing of the shutter-release button 2 is input to the CPU 22. The mode switch 13, which selects the shooting mode or playback mode, is capable of turning on a switch S1 or S2 selectively. The shooting mode is set by turning on the switch S1 and the playback mode by turning on the switch S2.

The digital still camera 1 is capable of flash photography. The electronic flash 5 is provided to achieve this, as described above. A light emission from the electronic flash 5 is turned on and off under the control of a flash control circuit 16.

An iris 25 and a zoom lens 7 are provided in front of a solid-state electronic image sensing device 27 such as a CCD. The iris 25 has its f/stop decided by a motor 33 controlled by a motor driver 30. The zoom lens 7 has its zoom position decided by a motor 34 controlled by a motor driver 31.

If the shooting mode is set by the mode switch 13, light representing the image of a subject that has passed through the iris 25 forms an image on the photoreceptor surface of the image sensing device 27 by the zoom lens 7. The image sensing device 27 is controlled by a timing generator 32 and the image of the subject is captured at a fixed period (a period of 1/30 of a second, by way of example). A video signal representing the image of the subject is output from the image sensing device 27 at a fixed period and is input to a CDS (correlated double sampling) circuit 28. The video signal that has been subjected to correlated double sampling in the CDS circuit 28 is converted to digital image data in an analog/digital converting circuit 29.

The digital image data is input to an image signal processing circuit 36 by an image input controller 35 and is subjected to prescribed signal processing such as a gamma correction. The digital image data is written to a VRAM (video random-access memory) 44, after which this data is read out and applied to an image display unit 47, whereby the image data is displayed as a moving image on the display screen of the image display unit 47.

The digital still camera 1 according to this embodiment is such that in a case where two image frames, namely a first image and a second image, have been obtained by continuous shooting, the two image frames can be combined. In the combining of the two image frames, feature points on the contour, etc., of a subject image contained in the first image are decided and corresponding points corresponding to these feature points are decided in the second image. The images are superimposed in such a manner that the feature points and corresponding points will coincide. As a result, camera shake that has occurred between the capture of the first image and the capture of the second image is corrected.

Further, in a case where an object moving from capture of the first image to capture of the second image exists, the motion of the subject image of the object is analyzed and the subject image of the moving object is positioned in such a manner that there will be no shift in a case where the images have been superimposed.

In order to thus superimpose the images, the digital still camera 1 is provided with a feature point/corresponding point detecting circuit 38, a motion analyzing circuit 39 and an image transforming/synthesizing circuit 45.

The digital image data obtained by image capture is input to an AF (autofocus) detecting circuit 41. The zoom position of the zoom lens 7 is controlled in the AF detecting circuit 41 so as to bring the image into focus. Further, the digital image data obtained by image capture is input also to an AE (automatic exposure)/AWB (automatic white balance) detecting circuit 42. The AE/AWB detecting circuit 42 decides the aperture of the iris 25 in such a manner that detected brightness will become an appropriate brightness. A white-balance adjustment is also carried out in the AE/AWB detecting circuit 42.

If the shutter-release button 2 is pressed, image data obtained by image capture is input to a compression processing circuit 37. The image data that has been subjected to prescribed compression processing in the compression processing circuit 37 is input to a video encoder 40 and is encoded thereby. The encoded image data is recorded on the memory card 48 under the control of a memory controller 46.

If the playback mode is set by the mode switch 13, the image data that has been recorded on the memory card 48 is read. The image represented by the read image data is displayed on the display screen of the image display unit 47.

Figure 3:
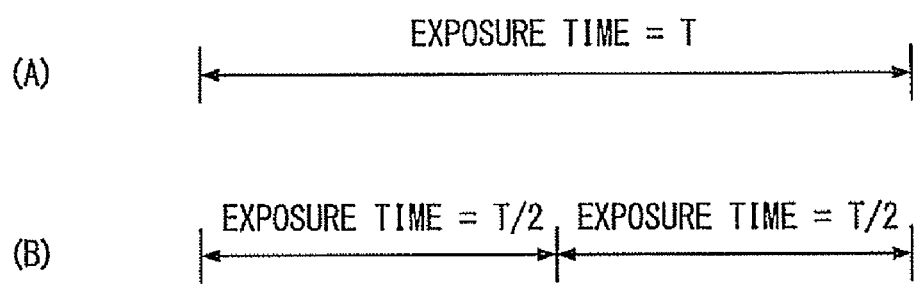
FIGS. 3A and 3B illustrate exposure times.

FIGS. 3A and 3B illustrate exposure times.

FIG. 3A illustrates exposure time in a case where the image of a subject is captured using an exposure time T and one image frame is obtained. FIG. 3B illustrates exposure time in a case where the image of a subject is captured twice in succession using an exposure time T/2 each time, which is one-half the exposure time T.

A large amount of camera shake occurs if the image of the subject is captured using the comparatively long exposure time T, as shown in FIG. 3A. By contrast, camera shake is diminished if the image of the subject is captured using the short exposure time T/2, as shown in FIG. 3B. Although there is little camera shake in each frame when two image frames are obtained by capturing the subject twice using the short exposure time T/2, brightness declines. The two image frames, therefore, are superimposed. The image obtained by superimposition (the "superimposed image") exhibits little camera shake and is bright. This embodiment makes it possible to obtain such a superimposed image.

Figure 4:
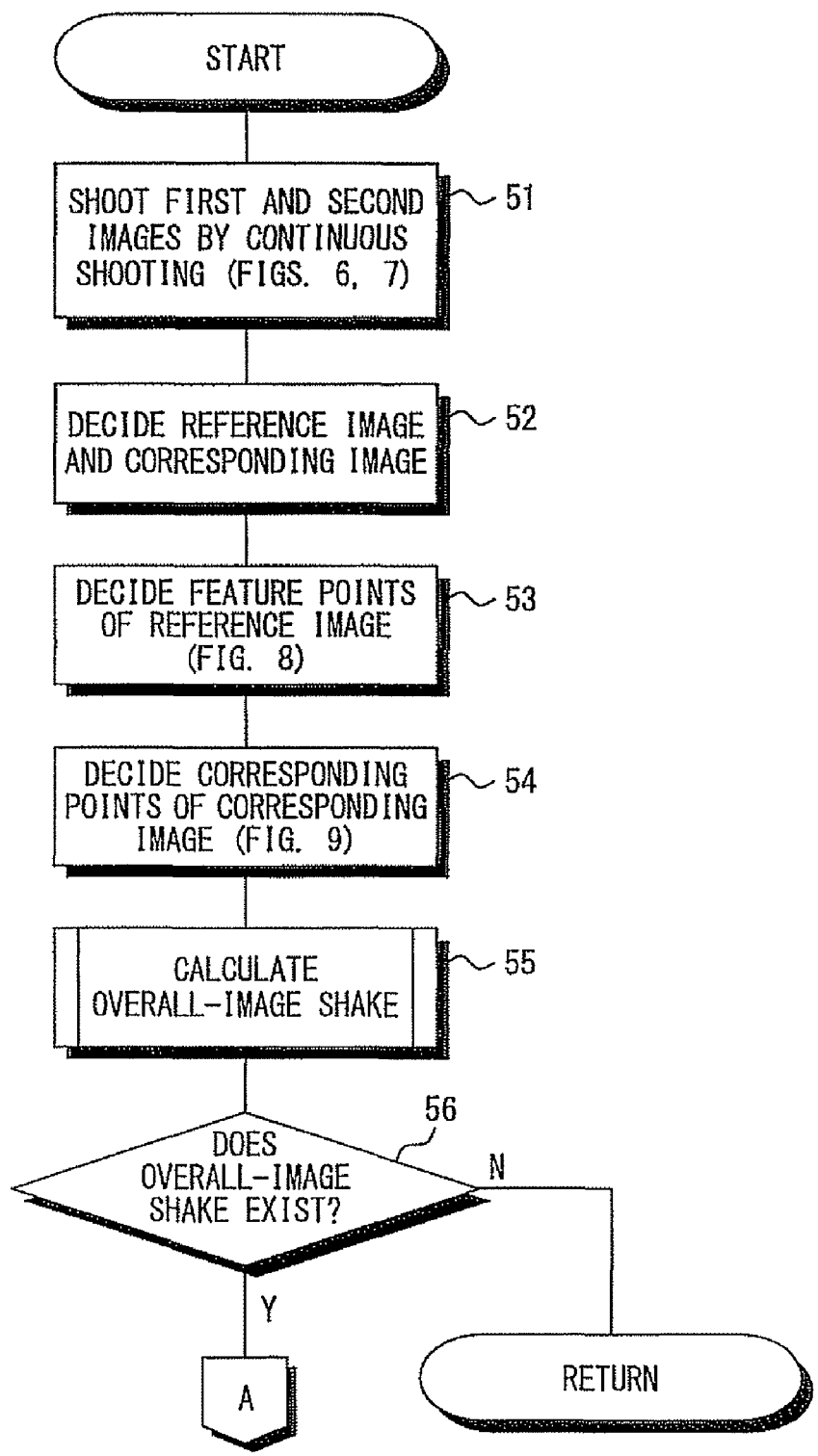
FIG. 4 is a flowchart illustrating processing executed by the digital still camera.
Figure 5:
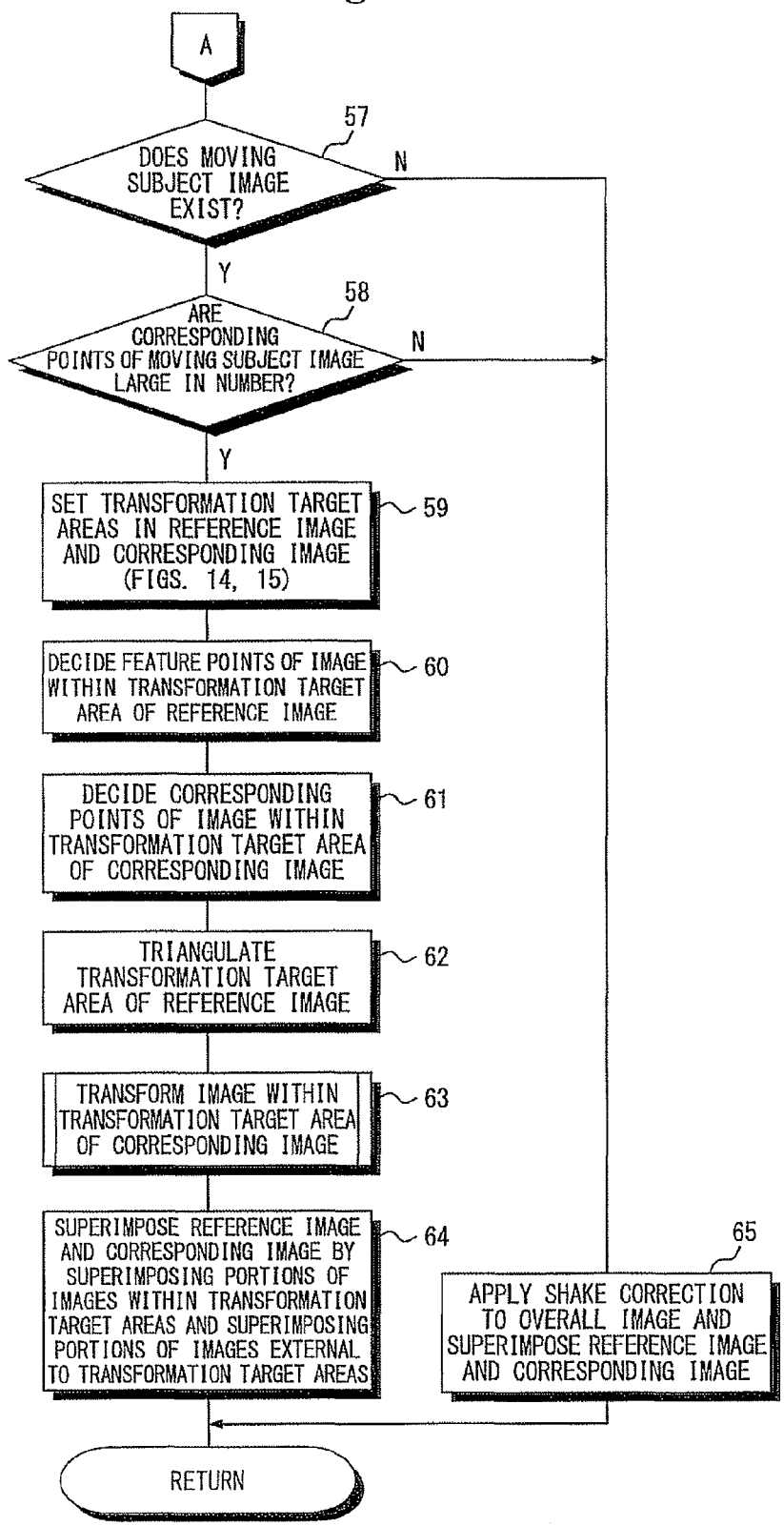
FIG. 5 is a flowchart illustrating processing executed by the digital still camera.

FIGS. 4 and 5 are flowcharts illustrating processing executed by the digital still camera 1.

First, the same subject is shot successively and first and second images are obtained (step 51 in FIG. 4). It will suffice if the same subject is shot and the first and second images obtained, even if shooting is not continuous. Alternatively, first and second images that have already been captured may be read out.

Figure 6:
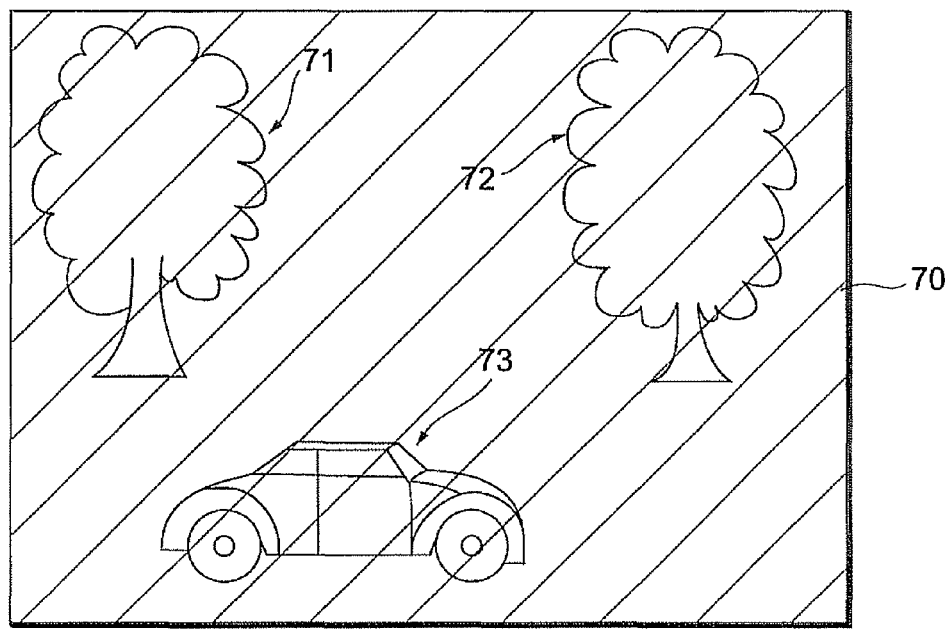
FIGS. 6 to 10 are examples of subject images.
Figure 7:
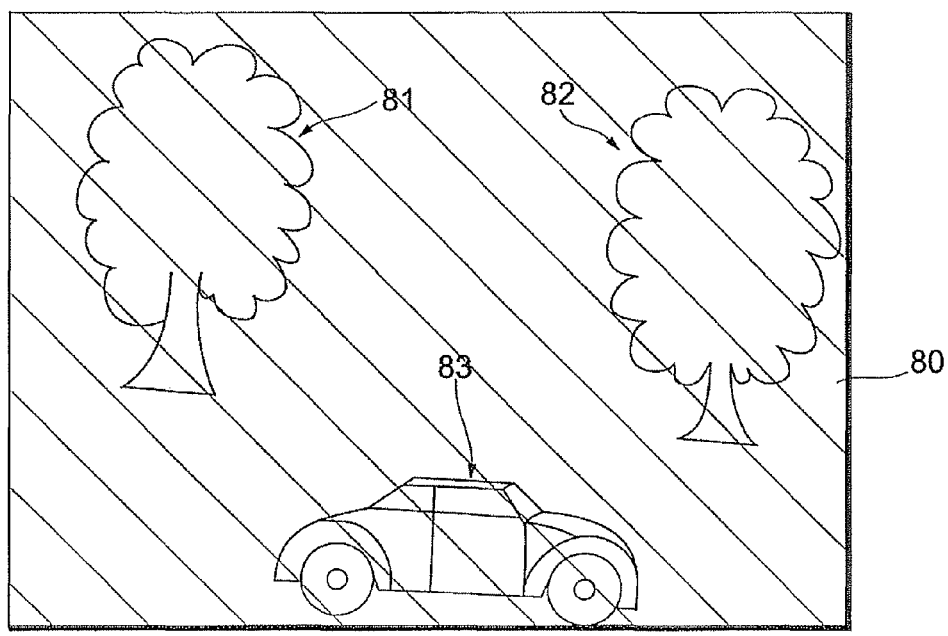

FIG. 6 is an example of the first image and FIG. 7 an example of the second image. These images are comparatively dark images owing to a short exposure times, as shown in FIG. 3B. The images are provided with hatching in order to indicate that they are dark images.

As shown in FIG. 6, the image 73 of an automobile is displayed toward the front of the first image 70 and images 71 and 72 of trees are displayed in back.

In FIG. 7, the second image 80 has been captured after the first image 70. Since the first image 70 and second image 80 have not been captured simultaneously, a shift ascribable to camera shake occurs between the first image 70 and second image 80 and the second image 80 is tilted in comparison with the first image 70. The image 83 of the automobile is displayed toward the front of the second image 80 as well and images 81 and 82 of trees are displayed in back.

The images 71 and 72 of the trees in the first image 70 are the same as the images 81 and 82, respectively, of the trees in the second image 80, and the image 73 of the automobile in the first image 70 and the image 83 of the automobile in the second image 80 are images of the same automobile.

When the first image 70 and second image 80 are obtained, a reference image and a corresponding image are decided (step 52 in FIG. 4). In this embodiment, the first image 70 is adopted as the reference image and the second image 80 is adopted as the corresponding image. However, the reverse may just as well be adopted.

When the reference image and corresponding image are decided, the feature points of the reference image are decided in a manner described next (step 53 in FIG. 4). Further, the corresponding points of the corresponding image are decided (step 54 in FIG. 4).

Figure 8:
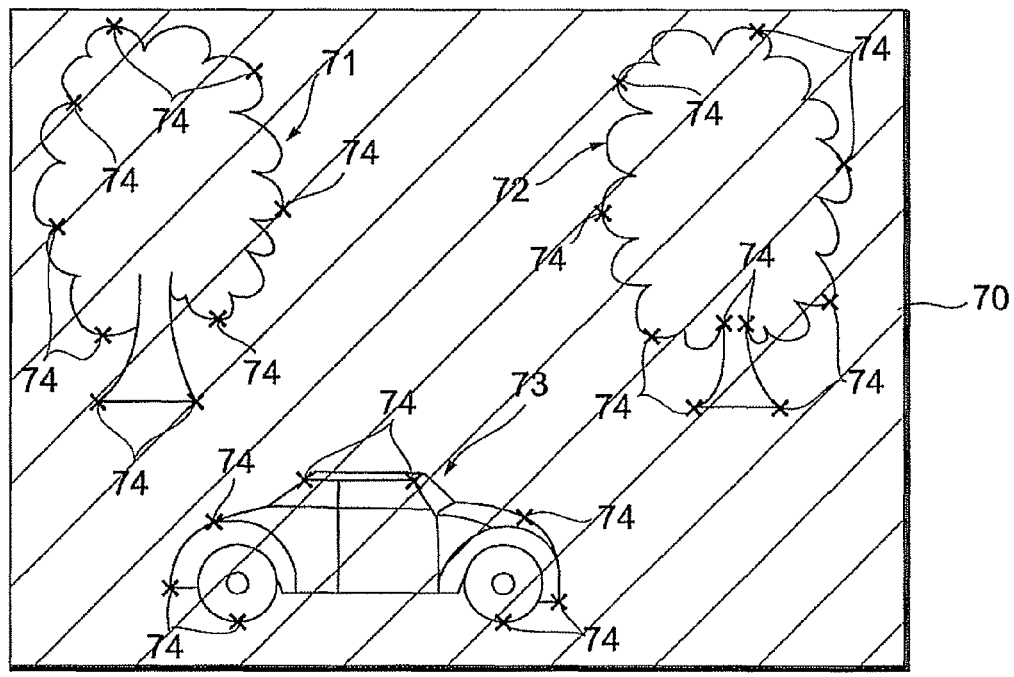

FIG. 8 illustrates the reference image (first image) 70.

The reference image 70 contains the images 71 and 72 of the trees and the image 73 of the automobile. A feature point defines one point on the contour of the subject image contained in the reference image 70 and indicates the characteristic shape of the subject image. A plurality of corresponding points 74 are decided with regard to each of the images 71 and 72 of the trees and image 73 of the automobile.

Figure 9:
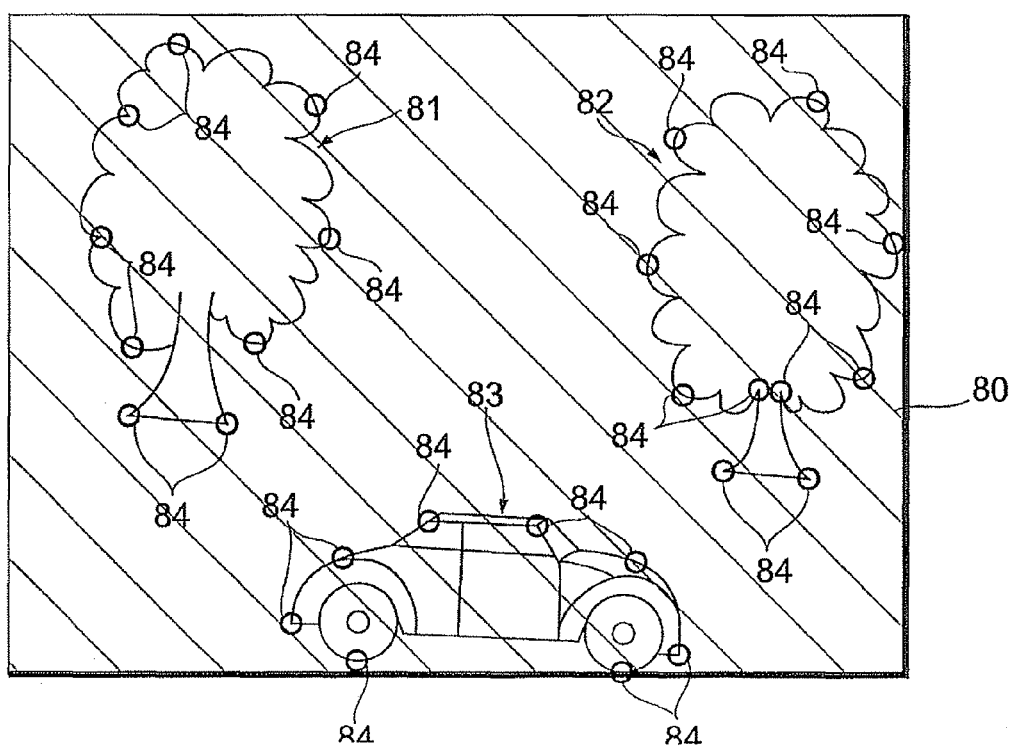

FIG. 9 illustrates the corresponding image (second image) 80.

Corresponding points indicate the points of pixels that correspond to the feature points decided in the reference image 70. Corresponding points 84 corresponding to the feature points 74 are decided with regard to each of the images 81 and 82 of the trees and image 83 of the automobile contained in the corresponding image 80.

Next, overall-image shake between the reference image 70 and corresponding image 80 is calculated (step 55 in FIG. 4). The calculation of shake of the overall image (calculation of amount and direction of shake) will be described in detail later. The corresponding image 80 is corrected in accordance with the calculated image shake. The shake correction may be performed when the reference image 70 and corresponding image 80 are superimposed.

Figure 10:
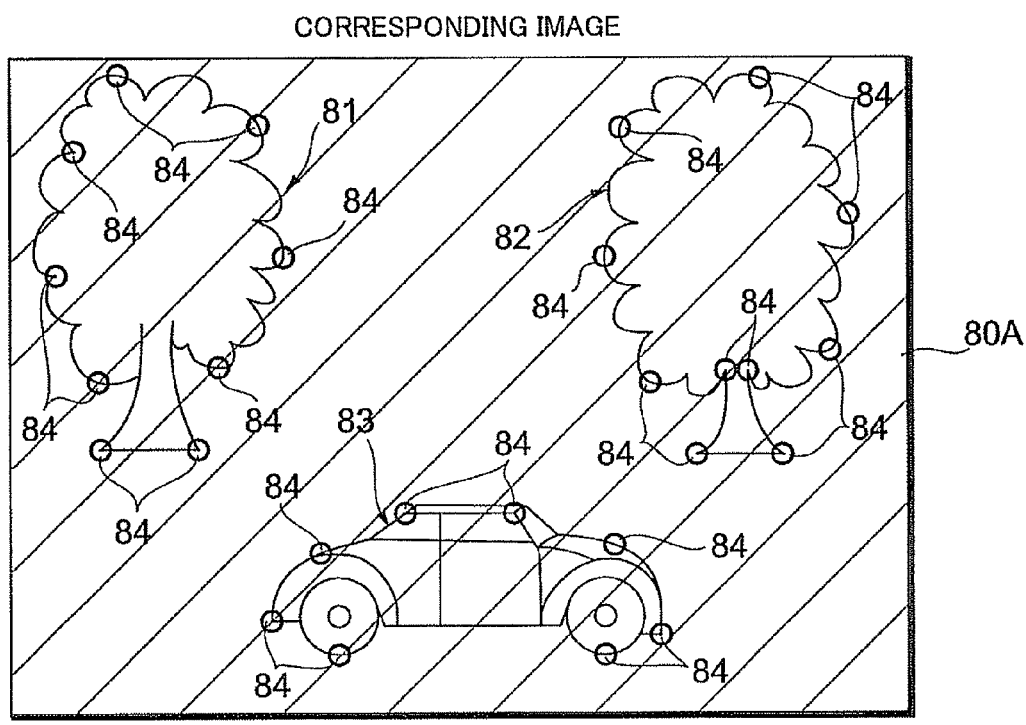

FIG. 10 is an example of a corresponding image 80A that has undergone a correction for shake. The shift between this image and the reference image 70 has been corrected by the shake correction.

Figure 11:
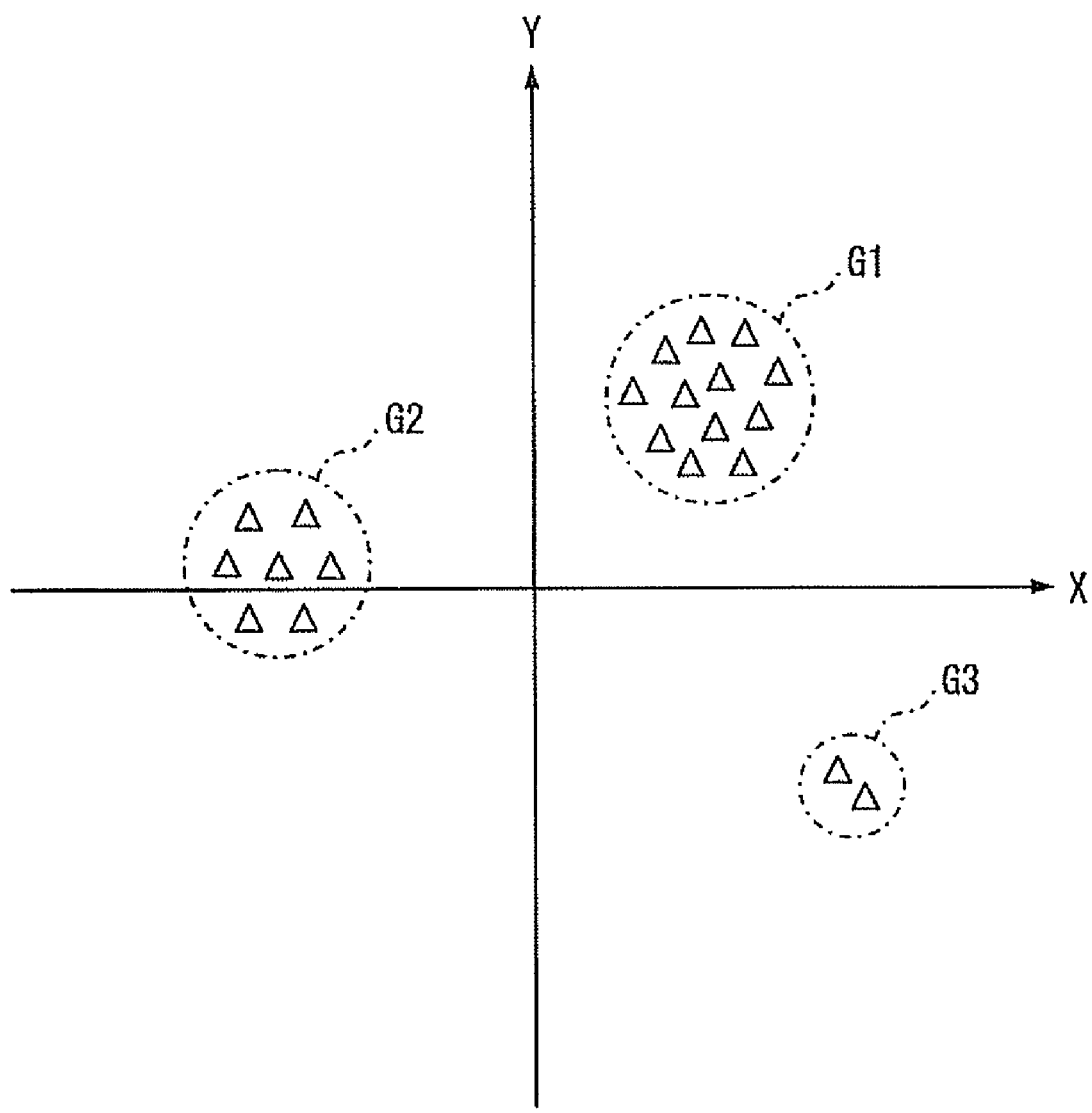
FIG. 11 illustrates camera shake and shift of a moving object.

FIG. 11 illustrates an optical flow graph.

This optical flow graph is such that the amount and direction of shift of the corresponding points, which correspond to the feature points, from these feature points is indicated by marks placed at every feature point (corresponding point). Three groups of marks are indicated in this optical flow graph. Assume that a first group G1 has the largest number of marks, a second group G2 has the next largest number of marks and a third group G3 has a very small number of marks. In this embodiment, it is determined that what is represented by the first group G1, which has the largest number of marks, is the overall-image shift between the reference image 70 and corresponding image 80. Further, it is determined that what is represented by the second group G2, in which the number of marks is greater than a prescribed number, is the amount and direction of movement of the subject image of the moving object that has moved between capture of the reference image 70 and capture of the corresponding image 80. What is represented by the third group G3, in which the number of marks is less than a prescribed number, is treated as garbage and is determined not to represent a moving subject image.

If overall-image shake exists ("YES" at step 56 in FIG. 4), then it is determined whether a subject image (moving subject image) representing an object that has moved from capture of the reference image 70 to capture of the corresponding image 80 exists in the corresponding image 80 (step 57 in FIG. 5). In this embodiment, the image 73 of the automobile is contained in the reference image 70, the image 83 of the automobile is contained also in the corresponding image 80, and the automobile is moving from capture of the reference image 70 to capture of the corresponding image 80. Accordingly, a determination is made that a moving subject image exists ("YES" at step 57 in FIG. 5).

Next, whether the corresponding points of the moving subject image are large in number (greater than a prescribed number) is checked (step 58 in FIG. 5). If a large number of corresponding points do not exist, then the subject image portion represented by these corresponding points is considered to be a moving subject image owing to the effects of garbage and therefore is eliminated.

Figure 12:
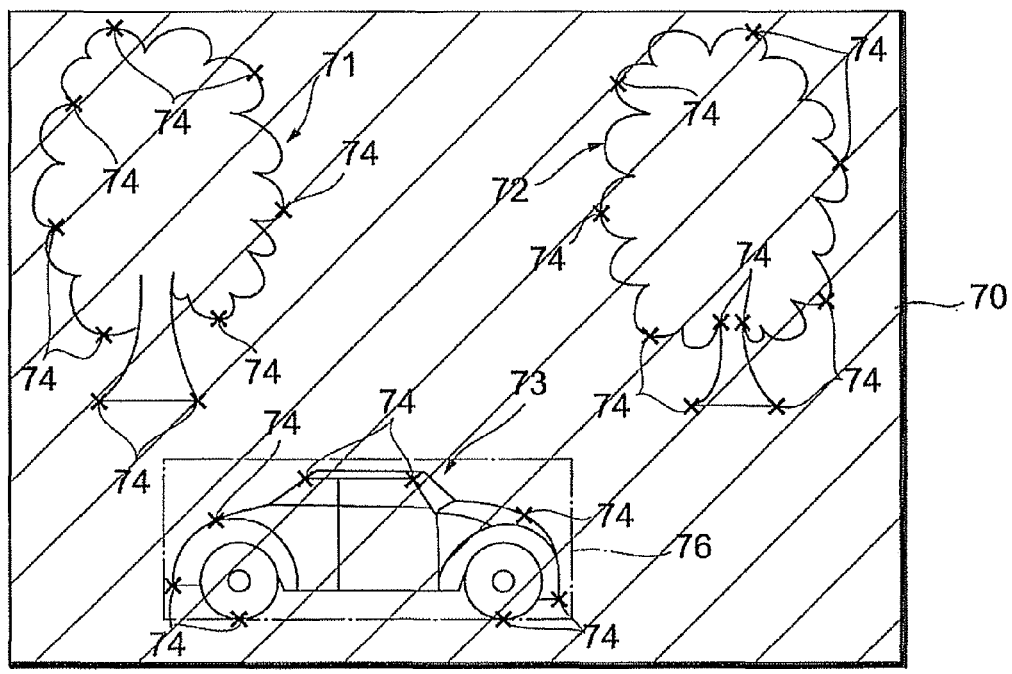
FIGS. 12 to 15 are examples of subject images.
Figure 13:
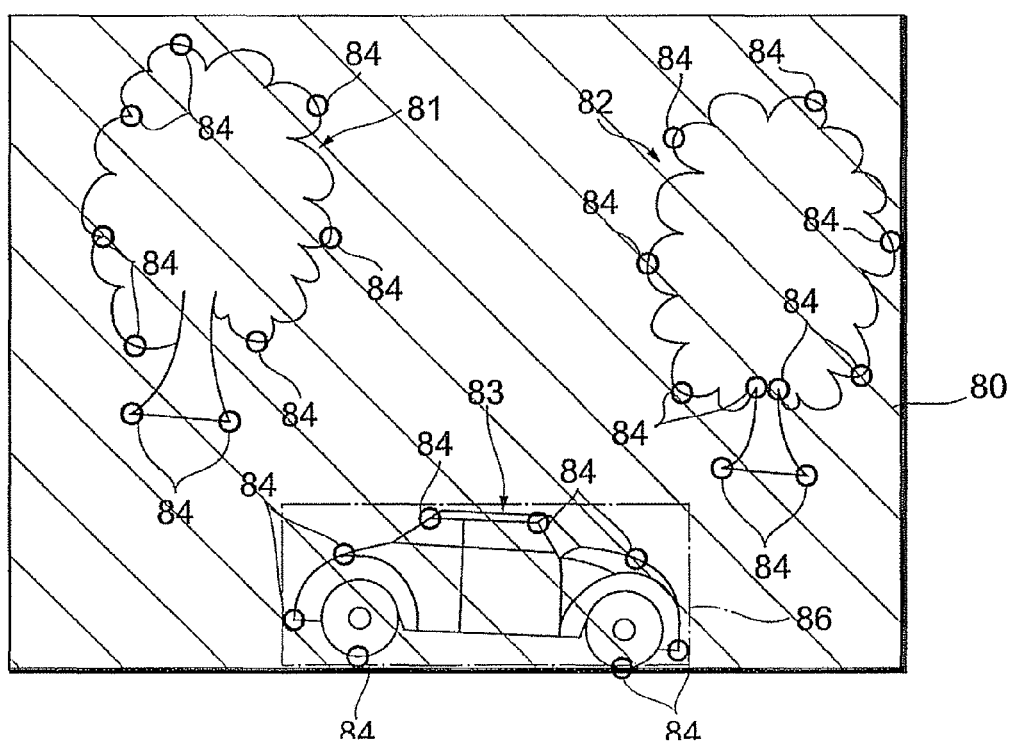

FIG. 12 illustrates a moving-portion area 76, which encloses the moving subject image (the image of the automobile) 73 determined as described above, in the reference image 70. FIG. 13 illustrates a moving-portion area 86 that encloses the moving subject image 83 in the corresponding image 80.

Since the automobile is moving, there is a shift between the position of the moving-portion area 76 shown in FIG. 12 and the position of the moving-portion area 86 shown in FIG. 13, and the shift depends upon the amount and direction of movement of the automobile. In this embodiment, a transformation target area that encloses both of the moving-portion areas 76 and 86 is set (step 59 in FIG. 5).

Figure 14:
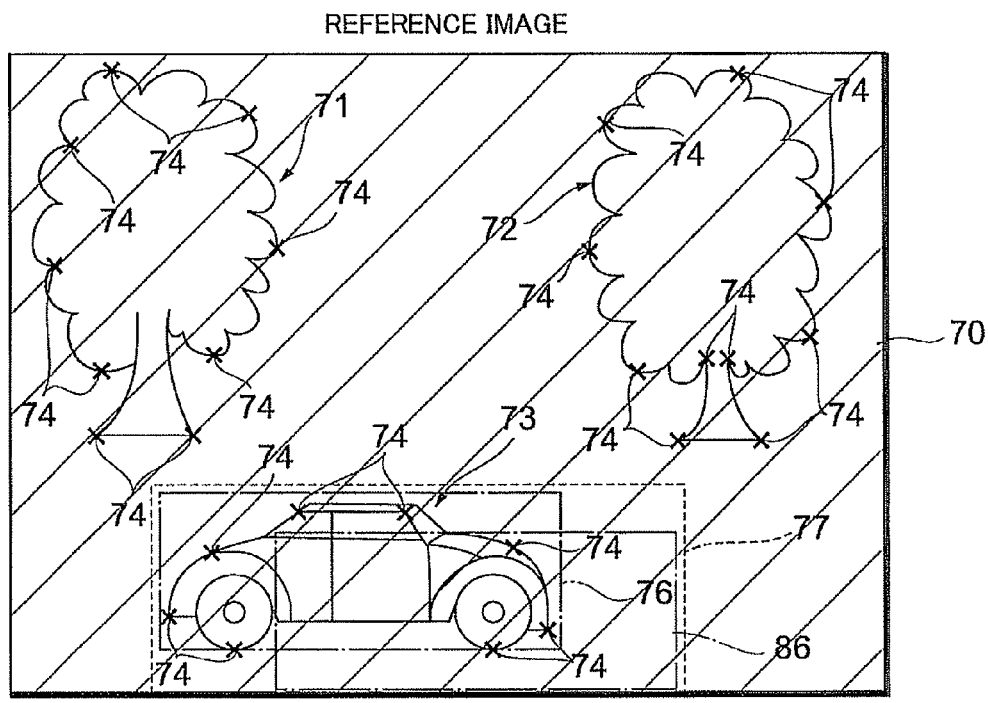

FIG. 14 illustrates a transformation target area 77 that has been set in the reference image 70. Further, in order to make it easy to understand that the transformation target area 77 encloses the moving-portion area 76 in the reference image 70 and the moving-portion area 86 in the corresponding image 80, the moving-portion area 86 in the corresponding image 80 is also shown in FIG. 14 in addition to the moving-portion area 76 in the reference image 70.

Figure 15:
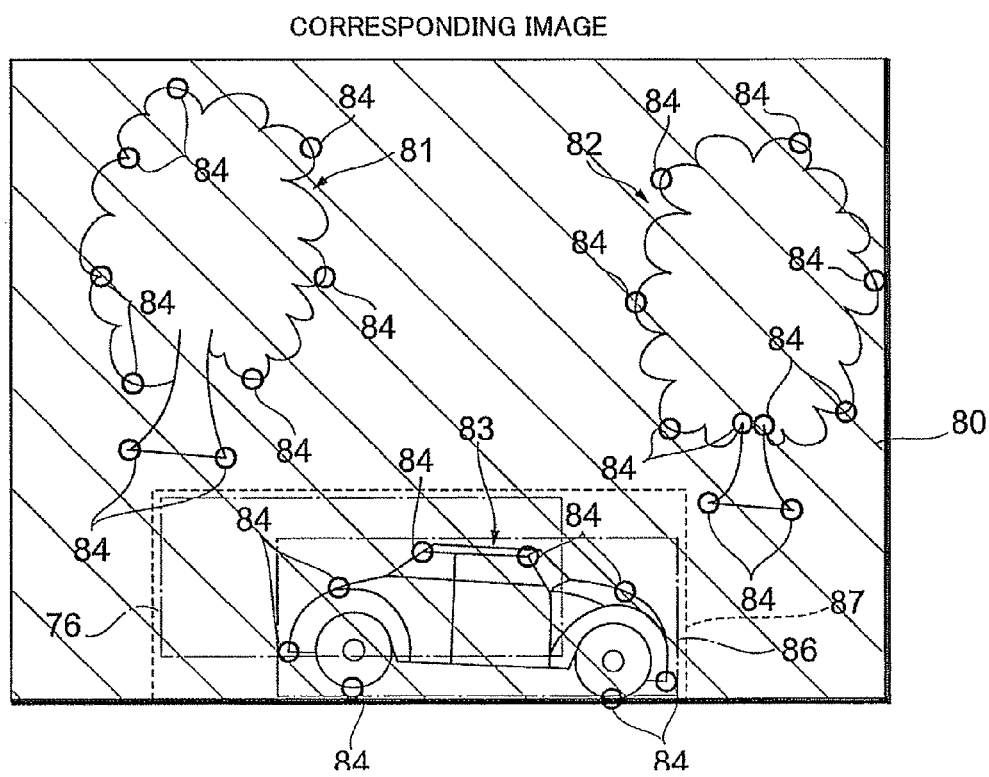

FIG. 15 illustrates a transformation target area 87 that has been set in the corresponding image 80. Further, in order to make it easy to understand that the transformation target area 87 encloses the moving-portion area 76 in the reference image 70 and the moving-portion area 86 in the corresponding image 80, the moving-portion area 76 in the reference image 70 is also shown in FIG. 15 in addition to the moving-portion area 86 in the corresponding image 80.

Next, feature points of the image within the transformation target area 77 of the reference image 70 are decided anew (step 60 in FIG. 5). Further, corresponding points of the image within the transformation target area 87 of the corresponding image 80, which points corresponds to the feature points within the transformation target area 77 of the reference image 70, are decided anew (step 61 in FIG. 5).

Figure 16:
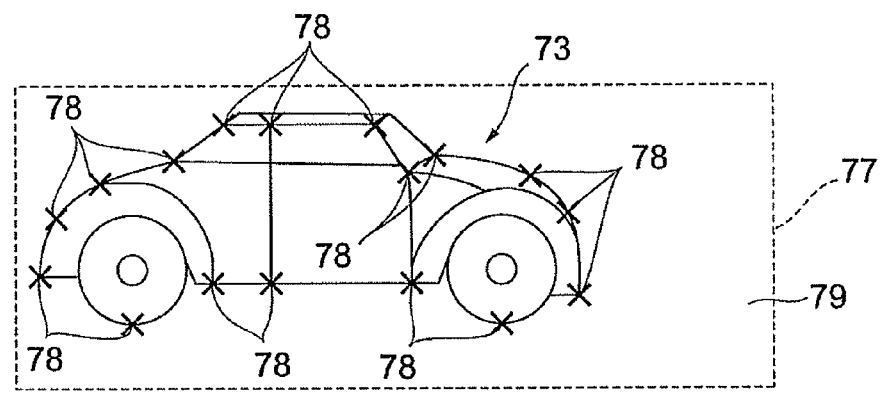
FIGS. 16 to 18 illustrate images within transformation target areas.

FIG. 16 illustrates an image 79 within the transformation target area 77 of the reference image 70.

The image 79 within the transformation target area 77 contains the image 73 of the automobile. A plurality of the feature points 78 are decided with regard to the image of the automobile. Preferably, the feature points 78 are taken at intervals smaller than the intervals of the feature points that have been decided with regard to the overall reference image 70 in the manner shown in FIG. 8. The reason is that in a case where an image transformation is performed, a more detailed image transformation can be achieved, as will be described later.

Figure 17:
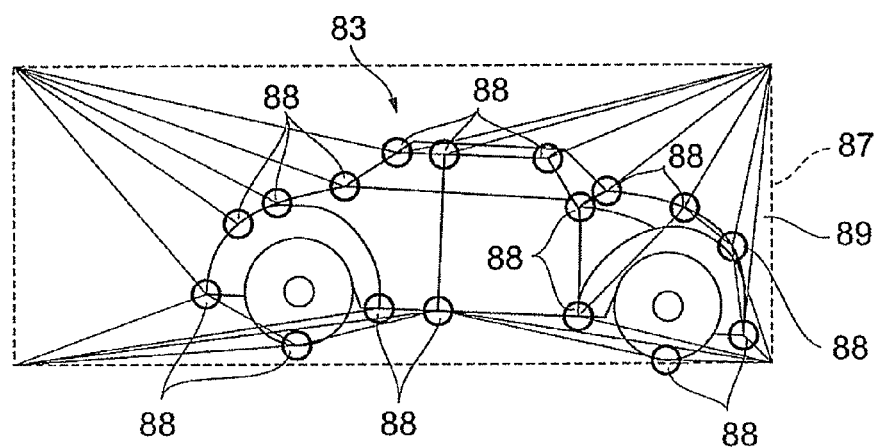

FIG. 17 illustrates an image 89 within the transformation target area 87 of the corresponding image 80.

A plurality of the corresponding points 88, which correspond to the feature points 78 that have been decided with regard to the image 79 within the transformation target area 77, are decided with regard to the image 89 within the transformation target area 87.

When the corresponding points 88 are decided, triangulation (polygonization) is carried out, as illustrated in FIG. 17, utilizing the corresponding points 88 decided and the vertices of the transformation target area 87 (step 62 in FIG. 5). With regard to the image 89 within the transformation target area 87 that has undergone triangulation, image transformation processing (triangular transformation processing) is executed, in accordance with the amount of movement of the moving subject image, for each triangle obtained by triangulation, in such a manner that the feature points 78 and the corresponding points 88 will coincide (step 63 in FIG. 5).

Figure 18:
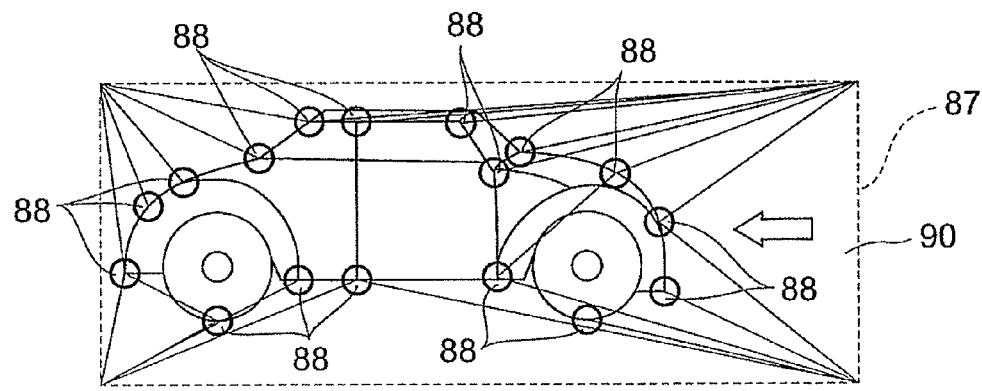

FIG. 18 illustrates an image 90 within the transformation target area 87 that has undergone image transformation processing. By virtue of this image transformation processing, the position of the image 83 of the automobile within the corresponding image 80 is made to coincide with the position of the image 73 of the automobile within the reference image 70.

As for the reference image 70 and the corresponding image 80, the image 79 within the transformation target area 77 shown in FIG. 16 and the image 90 shown in FIG. 18 within the transformation target area 87 that has undergone image transformation are superimposed with regard to the interior of the transformation target area 77. With regard to the exterior of the transformation target area 77, the reference image 70 and the corresponding image 80, which have been corrected for the camera shake between capture of the reference image 70 and capture of the corresponding image 80, are superimposed. A superimposed image is thus obtained (step 64 in FIG. 5).

Figure 19:
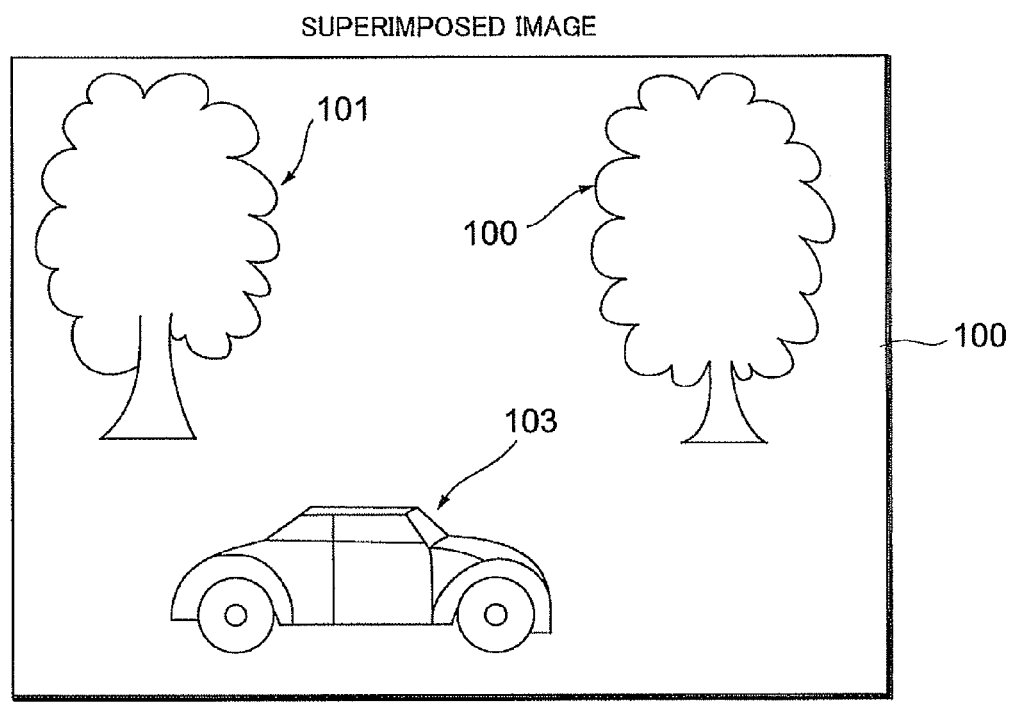
FIG. 19 is an example of a superimposed image.

FIG. 19 illustrates an example of a superimposed image 100.

The superimposed image 100 contains images 101 and 102 of trees and an image 103 of the automobile. Since camera shake between the reference image 70 and corresponding image 80 has been corrected, blur-free images 101 and 102 of the trees are displayed. Further, since the image 79 within the transformation target area 77 shown in FIG. 16 and the image 90 within the transformation target area 87 shown in FIG. 18 that has undergone image transformation have been superimposed by executing the above-described image transformation processing, the image 103 of the automobile that is displayed is blur-free. Further, since these images have an exposure time that is substantially the same as that shown in FIG. 3A, comparatively bright images are obtained.

If a moving subject image does not exist ("NO" at step 57 in FIG. 5), or even if it has been determined that a moving subject image exists, a large number of corresponding points do not exist in the moving subject image (i.e., if it has been determined that a moving subject image exists owing to the effects of garbage) ("NO" at step 58 in FIG. 5), then overall-image shake is corrected, without executing the above-described image transformation processing, and the reference image 70 and corresponding image 80 are superimposed to thereby generating the superimposed image (step 65 in FIG. 5).

Figure 20:
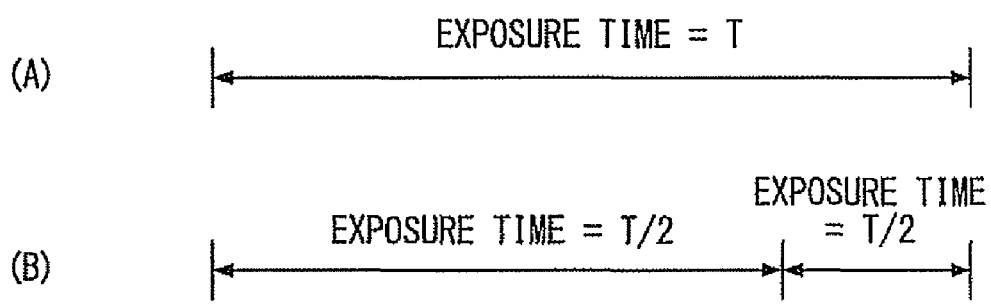
FIGS. 20A and 20B illustrate exposure times.

FIGS. 20A and 20B illustrate exposure times.

FIG. 20A illustrates exposure time in a case where one image frame is captured at an exposure time T in a manner similar to that shown in FIG. 3A. FIG. 20B illustrates exposure times t1, t2 in a case where a first image is captured at a first exposure time t1 and a second image is captured at a second exposure time t2. The relation (first exposure time t1)+(second exposure time t2)=(exposure time T) holds.

Since the exposure time t1 used in the capture of the first image is longer than the exposure time t2 used in the capture of the second image, the first image is bright and the second image is darker than the first image. A superimposed image of broad dynamic range is obtained by superimposing the first and second images in the manner described above using the second image in portions of the first image where brightness increases the more underexposure occurs and using the first image in portions of the second image where darkness increases the more overexposure occurs.

Figure 21:
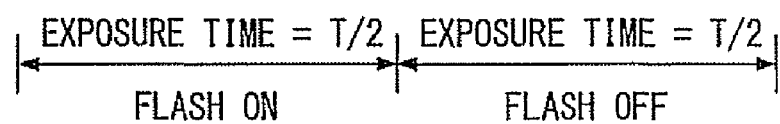
FIG. 21 illustrates exposure times.

FIG. 21 illustrates the manner in which an electronic flash operates when the first and second images are obtained. The exposure times of the respective first and second images are both the same, namely T/2. The electronic flash is turned on in a case where the first image is obtained and is turned off in a case where the second image is obtained. It may also be so arranged that the electronic flash is turned off in a case where the first image is obtained and is turned on in a case where the second image is obtained.

By switching between flash ON and OFF when the first image is captured and when the second image is captured, two image frames, namely the first and second images, having different brightnesses are obtained even though the exposure times are the same. By superimposing the first and second images in a manner similar to that described above, a superimposed image of broad dynamic range is obtained.

Figure 22:
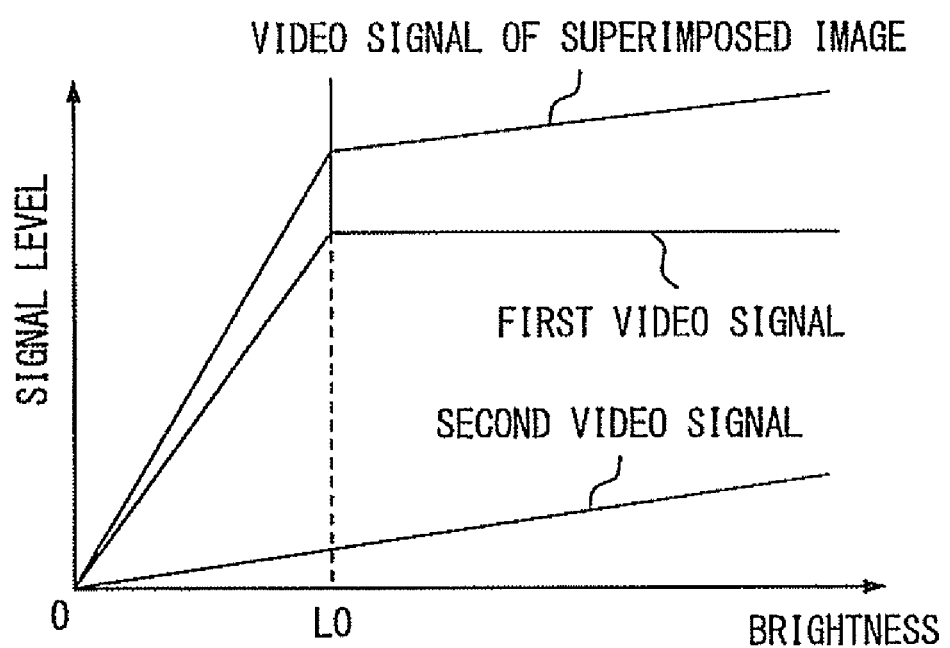
FIG. 22 illustrates the relationship between subject brightness and signal level.

FIG. 22 illustrates the relationship between signal level and subject brightness for each of the first and second images of different brightnesses.

Assume that the first image is bright, a first video signal representing the first image is obtained, the second image is darker than the first image and a second video signal representing the second image is obtained. Whereas the second video signal is such that the rate at which the signal level rises in accordance with brightness is small, the first video signal is such that the rate at which the signal level rises in accordance with brightness is large. In the case of the first video signal, therefore, subject brightness saturates at L0 and above. By superimposing the first and second images in the manner described above, the video signal of the superimposed image obtained has a level conforming to brightness even with regard to a subject having a brightness equal to or greater than the brightness L0 at which the first video signal saturates. The dynamic range of the superimposed image is thus broadened.

Next, a method of calculating overall-image shake (the processing of step 55 in FIG. 4) between the reference image and corresponding image will be described.

In a case where image shake has occurred from feature points to corresponding points, as described above, the shake can be calculated utilizing an affine transformation and a projective transformation.

Equation (1) illustrates the affine transformation relation, and Equation (2) illustrates the projective transformation relation. The position of a corresponding point is indicated by (X,Y) in Equations (1), (2), and the position of a feature point by (x,y).

$$\begin{bmatrix} x \\ y \end{bmatrix} = \begin{bmatrix} a & b \\ c & d \end{bmatrix} \begin{bmatrix} X \\ Y \end{bmatrix} + \begin{bmatrix} s \\ t \end{bmatrix} \qquad \text{Eq. (1)}$$

$$x = \frac{a \cdot X + b \cdot Y + s}{p \cdot X + q \cdot Y + 1} \quad Y = \frac{c \cdot X + d \cdot Y + t}{p \cdot X + q \cdot Y + 1} \qquad \text{Eq. (2)}$$

If shake is calculated using the method of least squares, we proceed as follows:

A GM estimation based upon the method of least squares is Equation (3) below, where the matrix T represents feature points and is indicated by Equation (4). Further, the matrix A is an affine parameter vector and is indicated by Equation (5). The matrix F represents corresponding points and is indicated by Equation (6). Furthermore, the transposed matrix of the matrix F is Equation (7).

$$T \approx F \cdot A \quad \text{where } A = (F^T F)^{-1} \cdot F^T T \qquad \text{Eq. (3)}$$

$$T = \begin{pmatrix} X1 \\ Y1 \\ X2 \\ Y2 \\ \vdots \\ \vdots \end{pmatrix} \qquad \text{Eq. (4)}$$

$$A = \begin{pmatrix} a \\ b \\ c \\ d \\ s \\ t \end{pmatrix} \qquad \text{Eq. (5)}$$

$$F = \begin{pmatrix} x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \\ \vdots & \vdots & \vdots & \vdots & \vdots & \vdots \\ \vdots & \vdots & \vdots & \vdots & \vdots & \vdots \end{pmatrix} \qquad \text{Eq. (6)}$$

$$FT = \begin{pmatrix} x1 & 0 & x2 & 0 & \ldots & \ldots \\ y1 & 0 & y2 & 0 & \ldots & \ldots \\ 0 & x1 & 0 & x2 & \ldots & \ldots \\ 0 & y1 & 0 & y2 & \ldots & \ldots \\ 1 & 0 & 1 & 0 & \ldots & \ldots \\ 0 & 1 & 0 & 1 & \ldots & \ldots \end{pmatrix} \qquad \text{Eq. (7)}$$

Finding the affine parameter vector results in Equation (8) below, and it can be defined as shown in Equations (9) and (10).

$$FT \cdot F = \begin{pmatrix} x1 & 0 & x2 & 0 & \ldots & \ldots \\ y1 & 0 & y2 & 0 & \ldots & \ldots \\ 0 & x1 & 0 & x2 & \ldots & \ldots \\ 0 & y1 & 0 & y2 & \ldots & \ldots \\ 1 & 0 & 1 & 0 & \ldots & \ldots \\ 0 & 1 & 0 & 1 & \ldots & \ldots \end{pmatrix} \begin{pmatrix} x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \\ \vdots & \vdots & \vdots & \vdots & \vdots & \vdots \\ \vdots & \vdots & \vdots & \vdots & \vdots & \vdots \end{pmatrix} = \qquad \text{Eq. (8)}$$

$$\begin{pmatrix} \sum_{k=1}^{n} xk^2 & \sum_{k=1}^{n} xkyk & 0 & 0 & \sum_{k=1}^{n} xk & 0 \\ \sum_{k=1}^{n} xkyk & \sum_{k=1}^{n} yk^2 & 0 & 0 & \sum_{k=1}^{n} yk & 0 \\ 0 & 0 & \sum_{k=1}^{n} xk^2 & \sum_{k=1}^{n} xkyk & 0 & \sum_{k=1}^{n} xk \\ 0 & 0 & \sum_{k=1}^{n} xkyk & \sum_{k=1}^{n} yk^2 & 0 & \sum_{k=1}^{n} yk \\ \sum_{k=1}^{n} xk & \sum_{k=1}^{n} yk & 0 & 0 & n & 0 \\ 0 & 0 & \sum_{k=1}^{n} xk & \sum_{k=1}^{n} yk & 0 & n \end{pmatrix}$$

$$F^T \cdot F = \begin{pmatrix} A & B & 0 & 0 & D & 0 \\ B & C & 0 & 0 & E & 0 \\ 0 & 0 & A & B & 0 & D \\ 0 & 0 & B & C & 0 & E \\ D & E & 0 & 0 & n & 0 \\ 0 & 0 & D & E & 0 & n \end{pmatrix} \qquad \text{Eq. (9)}$$

$$A = \sum_{k=1}^{n} xk^2 \qquad \text{Eq. (10)}$$

$$B = \sum_{K=1}^{n} xkyk$$

$$C = \sum_{k=1}^{n} yk^2$$

$$D = \sum_{k=1}^{n} xk$$

$$E = \sum_{k=1}^{n} yk$$

Further, the inverse matrix of Equation (9) is represented by Equation (11), where the relation of Equation (12) holds.

$$(F^T \cdot F)^{-1} = \frac{1}{\det} \times \begin{pmatrix} nC - E^2 & -nB + DE & 0 & 0 & BE - CD & 0 \\ -nB + DE & nA - D^2 & 0 & 0 & BD - AE & 0 \\ 0 & 0 & nC - E^2 & -nB + DE & 0 & BE - CD \\ 0 & 0 & -nB + DE & nA - D^2 & 0 & BD - AE \\ BE - CD & BD - AE & 0 & 0 & AC - B^2 & 0 \\ 0 & 0 & BE - CD & BD - AE & 0 & AC - B^2 \end{pmatrix} \qquad \text{Eq. (11)}$$

$$\det = n(AC - B^2) + D(BE - CD) + E(BD - AE) \qquad \text{Eq. (12)}$$

Equation (13) below holds from the Cauchy-Schwarz inequality, and the relation of Equation (14) holds.

$$AC - B^2 = \sum_{k=1}^{n} xk^2 \cdot \sum_{k=1}^{n} yk^2 - \left(\sum_{k=1}^{n} xkyk\right)^2 \geq 0 \qquad \text{Eq. (13)}$$

$$F^T \cdot T = \begin{pmatrix} x1 & 0 & x2 & 0 & \ldots & \ldots \\ y1 & 0 & y2 & 0 & \ldots & \ldots \\ 0 & x1 & 0 & x2 & \ldots & \ldots \\ 0 & y1 & 0 & y2 & \ldots & \ldots \\ 1 & 0 & 1 & 0 & \ldots & \ldots \\ 0 & 1 & 0 & 1 & \ldots & \ldots \end{pmatrix} \times \begin{pmatrix} X1 \\ Y1 \\ X2 \\ Y2 \\ \vdots \\ \vdots \end{pmatrix} = \begin{pmatrix} \sum_{k=1}^{n} xkXk \\ \sum_{k=1}^{n} ykXk \\ \sum_{k=1}^{n} xkYk \\ \sum_{k=1}^{n} ykYk \\ \sum_{k=1}^{n} Xk \\ \sum_{k=1}^{n} Yk \end{pmatrix} \qquad \text{Eq. (14)}$$

Since affine parameters are calculated from Equation (15) below, shake from feature points to corresponding points is calculated.

$$A = (F^T F)^{-1} \cdot F^T T \qquad \text{Eq. (15)}$$

Next, the image transformation processing (the processing of step 63 in FIG. 5) within the transformation target area mentioned above will be described.

If we assume that the vertices (x0,y0), (x1,y1) and (x2,y2) of a triangle generated as described above move to (X0,Y0), (X1,Y1) and (X2,Y2) (that is, if we assume movement from corresponding points within the transformation target area to feature points), then Equation (16) below will hold.

$$\begin{pmatrix} X0 \\ Y0 \\ X1 \\ Y1 \\ X2 \\ Y2 \end{pmatrix} = \begin{pmatrix} x0 & y0 & 0 & 0 & 1 & 0 \\ 0 & 0 & x0 & y0 & 0 & 1 \\ x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \end{pmatrix} \begin{pmatrix} a \\ b \\ c \\ d \\ s \\ t \end{pmatrix} \qquad \text{Eq. (16)}$$

Since the coefficients a, b, c, d, s, t are found from the inverse matrix of the transformation described above, we have Equations (17), (18) below, and Equation (19) is obtained, where the relation of Equation (20) holds.

$$\begin{pmatrix} X0 \\ Y0 \\ X1 \\ Y1 \\ X2 \\ Y2 \end{pmatrix} = C \cdot \begin{pmatrix} a \\ b \\ c \\ d \\ s \\ t \end{pmatrix} \qquad \text{Eq. (17)}$$

$$\begin{pmatrix} a \\ b \\ c \\ d \\ s \\ t \end{pmatrix} = C^{-1} \cdot \begin{pmatrix} X0 \\ Y0 \\ X1 \\ Y1 \\ X2 \\ Y2 \end{pmatrix} \qquad \text{Eq. (18)}$$

$$C^{-1} = \frac{1}{\det C} \begin{pmatrix} y1-y2 & 0 & y2-y0 & 0 & y0-y1 & 0 \\ x2-x1 & 0 & x0-x2 & 0 & x1-x0 & 0 \\ 0 & y1-y2 & 0 & y2-y0 & 0 & y0-y1 \\ 0 & x2-x1 & 0 & x0-x2 & 0 & x1-x0 \\ x1y2-x2y1 & 0 & x2y0-x0y2 & 0 & x0y1-x1y0 & 0 \\ 0 & x1y2-x2y1 & 0 & x2y0-x0y2 & 0 & x0y1-x1y0 \end{pmatrix} \qquad \text{Eq. (19)}$$

$$\det C = x0y1 + x2y0 + x1y2 - x0y2 - x0y2 - x2y1 - x2y1 - x1y0 \qquad \text{Eq. (20)}$$

If it is so arranged that (x0,y0) will always be at the origin, the Equation (21) below holds.

$$\begin{pmatrix} X0 \\ Y0 \\ X1 \\ Y1 \\ X2 \\ Y2 \end{pmatrix} = \begin{pmatrix} 0 & 0 & 0 & 0 & 1 & 0 \\ 0 & 0 & 0 & 0 & 0 & 1 \\ x1 & y1 & 0 & 0 & 1 & 0 \\ 0 & 0 & x1 & y1 & 0 & 1 \\ x2 & y2 & 0 & 0 & 1 & 0 \\ 0 & 0 & x2 & y2 & 0 & 1 \end{pmatrix} \begin{pmatrix} a \\ b \\ c \\ d \\ s \\ t \end{pmatrix} \qquad \text{Eq. (21)}$$

Since (x0,y0) is only the amount of shift, it moves to (s,t). Accordingly, the inverse matrix of Equation (19) becomes Equation (22) below, where the relation of Equation (23) holds.

$$C^{-1} = \frac{1}{\det C} \begin{pmatrix} y1-y2 & 0 & y2 & 0 & -y1 & 0 \\ x2-x1 & 0 & -x2 & 0 & x1 & 0 \\ 0 & y1-y2 & 0 & y2 & 0 & -y1 \\ 0 & x2-x1 & 0 & -x2 & 0 & x1 \\ x1y2-x2y1 & 0 & 0 & 0 & 0 & 0 \\ 0 & x1y2-x2y1 & 0 & 0 & 0 & 0 \end{pmatrix} \qquad \text{Eq. (22)}$$

$$\det C = x1y2 - x2y1 \qquad \text{Eq. (23)}$$

The coefficients a, b, c, d, s, t are as indicated by Equations (24) to (29) below.

$$a = \frac{1}{x1y2 - x2y1}((y1-y2)X0 + y2X1 - y1X2) \qquad \text{Eq. (24)}$$

$$b = \frac{1}{x1y2 - x2y1}((x2-x1)X0 - x2X1 + x1X2) \qquad \text{Eq. (25)}$$

$$c = \frac{1}{x1y2 - x2y1}((y1-y2)Y0 + y2Y1 - y1Y2) \qquad \text{Eq. (26)}$$

$$d = \frac{1}{x1y2 - x2y1}((x2-x1)Y0 - x2Y1 + x1Y2) \qquad \text{Eq. (27)}$$

$$s = X0 \qquad \text{Eq. (28)}$$

$$t = Y0 \qquad \text{Eq. (29)}$$

Thus, it is possible to move from corresponding points to feature points (to execute an image transformation) within the transformation target area described above.

As many apparently widely different embodiments of the present invention can be made without departing from the spirit and scope thereof, it is to be understood that the invention is not limited to the specific embodiments thereof except as defined in the appended claims.

What is claimed is:

1. An image transforming apparatus comprising:
a first feature point deciding device for deciding a plurality of feature points, which indicate the shape features of a subject image, from within a first image, wherein the first image and a second image have been obtained by continuous shooting;
a first corresponding point deciding device for deciding corresponding points, which correspond to the feature points decided by said first feature point deciding device, from within the second image;
a moving subject image detecting device for detecting moving subject images in respective ones of the first and second images, the moving subject images being subject images contained in the first and second images and representing an object moving from capture of the first image to capture of the second image;
a transformation target area setting device for setting transformation target areas in respective ones of the first and second images, the transformation target areas enclosing both the positions of feature points, which are present in the moving subject image detected by said moving subject image detecting device, from among the feature points decided by said first feature point deciding device, and the positions of corresponding points, which are present in the moving subject image detected by said moving subject image detecting device, from among the corresponding points decided by said first corresponding point deciding device;
a second feature point deciding device for deciding a plurality of feature points of an image within the transformation target area of the first image set by said transformation target area setting device;
a second corresponding point deciding device for deciding corresponding points, which correspond to the feature points decided by said second feature point deciding device, in an image within the transformation target area of the second image set by said transformation target area setting device; and
a first image transforming device for transforming the image within the transformation target area of the second image in such a manner that the feature points decided by said second feature point deciding device and the corresponding points decided by said second corresponding point deciding device will coincide.

2. The apparatus according to claim 1, further comprising a second image transforming device for transforming an image external to the transformation target area in the second image in such a manner that the corresponding points decided by said first corresponding point deciding device will coincide with the feature points decided by said first feature point deciding device.

3. The apparatus according to claim 1, further comprising a superimposing device for superimposing the image that has been transformed by said first image transforming device on the first image with regard to the image within the transformation target area, and, with regard to the image external to the transformation target area, superimposing the second image on the first image in such a manner that the corresponding points decided by said first corresponding point deciding device will coincide with the feature points decided by said first feature point deciding device.

4. The apparatus according to claim 1, further comprising an image capture device for obtaining the first and second images by performing continuous shooting at the same amounts of exposure or at different amounts of exposure.

5. The apparatus according to claim 1, further comprising:
an electronic-flash control device for controlling an electronic-flash light emission; and
an image capture control device for controlling said image capture device so as to shoot under the electronic-flash light emission and shoot under the absence of the electronic-flash light emission controlled by said electronic-flash control device, and obtaining the first and second images.

6. A method of controlling operation of an image transforming apparatus, comprising the steps of:
  deciding a plurality of first feature points, which indicate the shape features of a subject image, from within a first image, wherein the first image and a second image have been obtained by continuous shooting;
  deciding first corresponding points, which correspond to the first feature points that have been decided, from within the second image;
  detecting moving subject images in respective ones of the first and second images, the moving subject images being subject images contained in the first and second images and representing an object moving from capture of the first image to capture of the second image;
  setting transformation target areas in respective ones of the first and second images, the transformation target areas enclosing both the positions of first feature points, which are present in the moving subject image that has been detected, from among the first feature points that have been decided, and the positions of first corresponding points, which are present in the moving subject image that has been detected, from among the first corresponding points that have been decided;
  deciding a plurality of second feature points of an image within the set transformation target area of the first image;
  deciding second corresponding points, which correspond to the second feature points that have been decided, in an image within the set transformation target area of the second image; and
  transforming the image within the transformation target area of the second image in such a manner that the second feature points that have been decided and the second corresponding points that have been decided will coincide.

7. A computer-readable medium embodied with a program for controlling a computer of an image transforming apparatus so as to:
  decide a plurality of first feature points, which indicate the shape features of a subject image, from within a first image, wherein the first image and a second image have been obtained by continuous shooting;
  decide first corresponding points, which correspond to the first feature points that have been decided, from within the second image;
  detect moving subject images in respective ones of the first and second images, the moving subject images being subject images contained in the first and second images and representing an object moving from capture of the first image to capture of the second image;
  set transformation target areas in respective ones of the first and second images, the transformation target areas enclosing both the positions of first feature points, which are present in the moving subject image that has been detected, from among the first feature points that have been decided, and the positions of first corresponding points, which are present in the moving subject image that has been detected, from among the first corresponding points that have been decided;
  decide a plurality of second feature points of an image within the set transformation target area of the first image;
  decide second corresponding points, which correspond to the second feature points that have been decided, in an image within the set transformation target area of the second image; and
  transform the image within the transformation target area of the second image in such a manner that the second feature points that have been decided and the second corresponding points that have been decided will coincide.

* * * * *